United States Patent Office 3,503,220
Patented Mar. 31, 1970

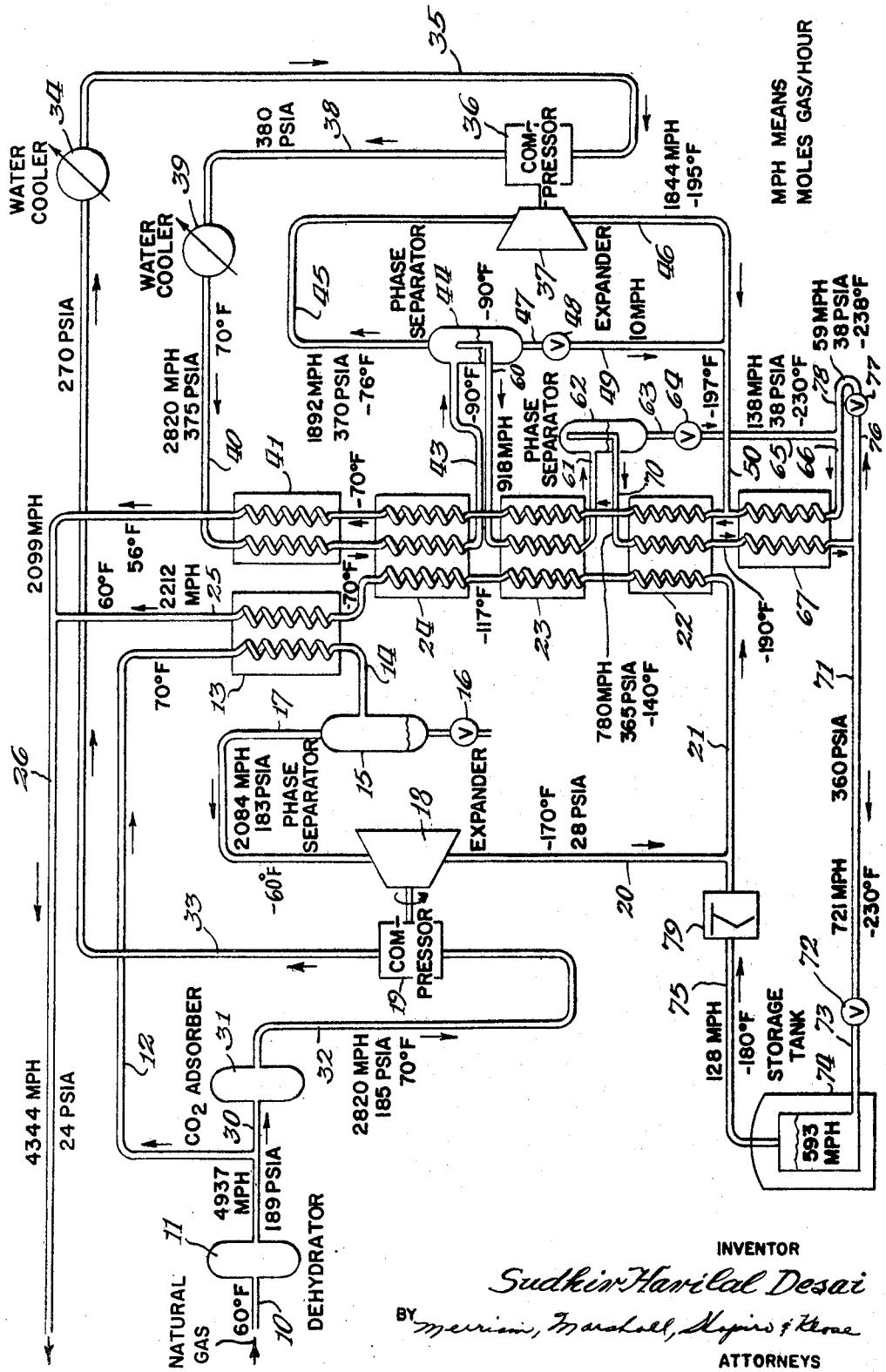

3,503,220
EXPANDER CYCLE FOR NATURAL GAS LIQUEFICATION WITH SPLIT FEED STREAM
Sudhir Harilal Desai, Clarendon Hills, Ill., assignor to Chicago Bridge & Iron Company, Oak Brook, Ill., a corporation of Illinois
Filed July 27, 1967, Ser. No. 656,441
Int. Cl. F25j 3/08
U.S. Cl. 62—23                    1 Claim

ABSTRACT OF THE DISCLOSURE

Provided is a process and apparatus for liquefying natural gas containing carbon dioxide. The natural gas stream is divided into two parts. A first part, from which carbon dioxide is not removed, is expanded to provide refrigeration for the second part. The second part is purified of carbon dioxide and cooled by (a) heat exchange with the cooled first part and (b) heat exchange with some of the second part which is expanded to provide low temperature refrigeration, and then flashed to storage at about atmospheric pressure and −259° F.

---

This invention relates to processes and apparatus for liquefying natural gas.

Natural gas is widely used as a source of energy for industry, commercial and residential purposes. Most natural gas is transported from its production sources by cross-country pipelines to gas distribution centers which then distribute it to customers. Consumption of natural gas is not uniform during the year, particularly in those areas of the country where it is a primary fuel for heating because of seasonal temperature changes in the fall and winter. Pipeline transportation volume, however, cannot fluctuate widely in the amount of gas supplied in any one period because of the supply problem at well heads and for economical reasons such as rate schedules which increase the charge drastically when contract demand quantities of gas are exceeded. In order to meet increased consumption, whatever the cause, it is becoming more and more feasible to liquefy natural gas when supply exceeds the demand and store it for use during peak consumption periods.

In order to minimize storage tank costs, liquefied natural gas in large volumes is generally stored at about atmospheric pressure since higher pressures would require costly, thick walled pressure vessels. To maintain natural gas liquid at about atmospheric pressure requires that it be at about −259° F. Cooling the natural gas to this temperature obviously requires large scale efficient refrigeration systems.

One of the problems involved with natural gas liquefaction is the need to remove carbon dioxide from it. If carbon dioxide is not removed from the gas stream being liquefied, it will solidify out at the low temperatures involved and foul pipes, valves and heat exchangers. While solidified carbon dioxide can be purged from the system, this requires auxiliary equipment and control to determine when fouling exists, all of which increases the installation cost.

Equipment to remove carbon dioxide must generally be quite large to handle the volume of gas processed. Multiple units are often needed for this purpose so that one or more can be regenerated or purged of carbon dioxide while the system remains on stream. One of the ways to remove carbon dioxide is by adsorption on molecular sieves. Although this is an effective method, the sieves themselves and accompanying equipment are expensive so that any method which minimizes the need to remove carbon dioxide and sieve regeneration is advantageous.

Systems of liquefying natural gas which are in use generally take the natural gas as received from a cross-country pipeline at about 150 to 500 p.s.i.a. and, as a first step, substantially increase its pressure by means of a compressor powered by an independent source such as an electric motor. Such a compressor, because of its large capacity, is expensive and requires trained operating and maintenance personnel and if possible its use is to be avoided.

The present invention provides a novel process and apparatus for liquefying natural gas. It is characterized by avoidance of any necessity to use an independently powered compressor, the removal of carbon dioxide from only that part of the gas feed to be subjected to natural gas liquefaction temperatures, which would inherently solidify the carbon dioxide, and the use of the other part of the gas feed containing carbon dioxide to obtain warm temperature refrigeration without solidification of the carbon dioxide therein. Liquefaction, furthermore, is effected by utilization of the potential power of the natural gas due to the pressure at which it is received from a cross-country pipeline. In other words, the process utilizes the pressure drop from transmission line to distribution main to produce refrigeration sufficient to liquefy a portion of the gas passing through such a pressure let-down station. Other advantages of the invention will be described hereinafter, and other advantages not described will be obvious to those skilled in the art.

The method of the subject invention is directed primarily to liquefying natural gas containing initially methane, carbon dioxide, other constituents such as helium and nitrogen, and hydrocarbons heavier than methane. In the method, a supply of natural gas at substantial pressure and ambient temperature, such as is received from a cross-country natural gas transportation pipeline, is first divided into two main streams comprising a first main stream and a second main stream.

The temperature of the first main stream is lowered, without removal of carbon dioxide, by expansion of the stream to a substantially lower pressure and lower temperature than the supply, without solidification of carbon dioxide in the stream, to form a cold first main stream.

Carbon dioxide is removed from the second main stream, the pressure of the carbon dioxide-free second main stream is increased, and then it is cooled by means of heat exchange with the cold first main stream to liquefy a substantial amount of heavy hydrocarbons in the gas.

The second main stream is then sent into heat exchange with the cold first main stream to further cool the second stream and separate a comparatively impure liquid natural gas fraction containing appreciable heavy hydrocarbons.

Further cooling of the second main stream is effected by heat exchange with low temperature vapor formed by expansion of the impure liquid natural gas fraction to liquefy the second main stream at a low temperature and substantial superatmospheric pressure. By flashing the liquefied second main stream by pressure reduction, its temperature is reduced to at least −259° F. for storage at about atmospheric pressure.

It is also advisable, in practicing the process to take part of the liquefied second main stream, after removal of impurities, and pass it into heat exchange with the second main stream during the process of liquefaction thereof. In addition, it is desirable to take the cold first main stream, after being passed into heat exchange to cool the second main stream, and pass it into heat exchange with the incoming first main stream feed before the same is cooled by expansion.

Clear advantages of economy and efficiency are furthermore obtained when expansion of the first main stream is effected through an expander-compressor which simultaneously increases the pressure of the second main stream following removal of carbon dioxide. Also beneficial is to first cool the first main stream feed and then pass it through a phase separator vessel to remove very heavy natural gas constituents before the stream is cooled by expansion.

Another important feature of the process is to expand part of the second main stream, after removal of heavy hydrocarbons, through an expander-compressor which simultaneously compresses incoming gas of the second main stream, and then pass the expanded gas emerging from the turbo-expander at a lower temperature into heat exchange with the remainder of the second main stream to cool the same during liquefaction thereof.

An equally important part of this invention is the provision of novel apparatus for liquefying natural gas containing carbon dioxide. Included within the novel apparatus is conduit means for receiving a supply of natural gas at substantial pressure and ambient temperature, such as from a cross-country natural gas transportation pipeline, and a first apparatus circuit communicating with the conduit means and adapted to receive a first main stream of natural gas containing carbon dioxide therefrom. The first apparatus circuit has means to expand the first main stream thereby cooling the stream, heat exchanger means through which the cooled stream passes, and means conducting the stream from the heat exchanger means to means for receiving the gas for subsequent desirable use.

A second apparatus circuit communicates with the conduit means and is adapted to receive a second main stream of natural gas from the conduit means. The second apparatus circuit has means for removing carbon dioxide from the second main stream, means to compress the carbon dioxide-free stream, means to convey the stream to heat exchanger means cooled by the first main stream and then to a first phase separator to remove heavy hydrocarbons from the stream, means to further convey the second main stream through heat exchanger means cooled by the first main stream to a second phase separator for removing impure liquefied natural gas, means for supplying the second main stream vapor from the second phase separator to a terminal heat exchanger to liquefy the vapor, means to supply the impure liquefied natural gas from the second phase separator as vapor to the terminal heat exchanger to cool the same, and means for removing the second main stream from the terminal heat exchanger as liquefied natural gas and flashing the same to storage at about −259° F. and substantially atmospheric pressure.

Advisably also included in the apparatus is means for directing part of the liquefied natural gas from the terminal heat exchanger to expansion means, then to the terminal heat exchanger, and then to the heat exchanger means cooled by the first main stream. By also including an expander-compressor arranged to have the turbine in the first main stream to expand the same and the compressor in the second main stream to compress the same additional benefits of operation are achieved.

To further increase the efficiency of the apparatus, means are included for conveying part of the second main stream from the first phase separator to the expander of an expander-compressor and then to heat exchanger means to cool the second main stream at a location downstream from the first phase separator, said compressor being located so as to compress the second main stream before it is conveyed to the first phase separator.

The invention will now be described further in conjunction with the attached drawing. An incoming natural gas feed stream containing an appreciable amount of carbon dioxide is received by pipe 10 and fed to dehydrator 11. The natural gas is received at a rate, for purposes of specific illustration, at a rate of 45.4 million standard cubic feet per day at 195 p.s.i.a. and 60° F. The natural gas used for this specific embodiment is 93.2% methane, 3.9% ethane, 0.8% propane, 0.4% butane, 0.6% nitrogen and 1.1% carbon dioxide.

The natural gas is fed from dehydrator 11 at a rate of 4937 moles per hour (MPH) and then split into two main streams. A first main stream is sent by pipe 12, without removal of carbon dioxide, at a temperature of about 70° F. through heat exchanger 13 where the stream is cooled to about −60° F. The first main stream comprises about 2084 MPH or about 40% of the feed stream. Heat exchanger 13 is provided with refrigeration, advisably supplied for this purpose by cold vapor obtained from the first main stream as will be described more fully hereinafter.

The first main stream, after being cooled in heat exchanger 13 is conducted by pipe 14 to phase separator or vessel 15 where heavy ends are removed from the stream. The heavy ends are drained by valve 16 and stored for other uses. The first main stream is then fed as gas or vapor from phase separator 15 by pipe 17 at about −60° F. and 183 p.s.i.a. to gas operated expander 18 (sometimes called a turbine) which is coupled to compressor 19 to drive the same. In expanding through expander 18 the temperature and pressure of the first main stream are lowered to −170° F. and 28 p.s.i.a. This stream is fed from expander 18 to pipe 20 to pipe 21 and then successively through heat exchangers 22, 23, 24 and 13 from which it is fed at a rate of 2212 MPH at 60° F. to pipe 25 and then to pipe 26 for feeding into a gas distribution line such as serves residential and industrial consumers.

In passing through heat exchangers 22, 23 and 24 the cold first main stream functions as a source of relatively high temperature refrigeration to cool the natural gas being liquefied as will be described hereinafter. By relatively high temperature refrigeration is meant that the first main stream is not lowered to a temperature below which its carbon dioxide content will solidify out and foul pipes, valves and heat exchanger surfaces. Since carbon dioxide will generally solidify out of natural gas at about −175° F. the first main stream is kept above, but as close to this temperature as is practical.

Although the process as described so far shows the first main stream being passed through heat exchangers 22, 23 and 24, it is also feasible to skip one or two of these heat exchangers provided sufficient refrigeration is obtained from the first main stream to facilitate liquefaction of natural gas.

A second main stream of about 2820 MPH, or nearly 60% of the incoming natural gas feed stream, is fed by pipe 30 to carbon dioxide adsorber 31 where the carbon dioxide is removed as by molecular sieves. From adsorber 31 the second main stream is fed by pipe 32 at about 185 p.s.i.a. and 70° F. to compressor 19. By means of compressor 19 the stream pressure is increased to about 270 p.s.i.a. The second main stream is fed from the compressor by pipe 33 to water cooler 34 where the stream is cooled to about 70° F. and then fed by pipe 35 to compressor 36 coupled to turbine 37. By means of compressor 36 the second main stream is increased to about 380 p.s.i.a. and then fed by pipe 38 to water cooler 39. The second main stream leaves water cooler 39 at about 70° F. and is fed by pipe 40 to heat exchanger 41 where it is cooled to about −70° F. From heat exchanger 41 the second main stream is passed to heat exchanger 24 where it is further cooled to about −90° F. from which it is fed by pipe 43 to phase separator 44. A small amount of heavy hydrocarbons liquefies in phase separator 44 and is withdrawn by pipe 47, passed through expansion valve 48 and then to pipes 49 and 50 for passing through heat exchanger 22 to provide refrigeration.

About 1892 MPH, or nearly two-thirds of the gas vapor, is removed from phase separator 44 and sent at 370 p.s.i.a. and −76° F. by pipe 45 to expander or turbine 37. In expanding through expander 37 the gas expands and in so doing drives compressor 36. The gas in leaving the expander is fed by pipe 46 at about −195° F. to pipe 50 and thus to heat exchanger 22 to provide refrigeration for liquefying part of the natural gas.

About 918 MPH, or nearly one-third, of the vapor is removed from phase separator 44 by pipe 60 and fed through heat exchanger 23 where it is further refrigated and then fed by pipe 61 to phase separator 62. The gas in phase separator 62 is at about 365 p.s.i.a. and −140° F. and under these conditions a substantial amount of natural gas is liquefied, i.e. about 15% of the feed to the separator although the system can operate effectively with 0–40% liquefaction here. Also, generally operable conditions of −90° F. to −150° F. and 350 to 550 p.s.i.a. are suitable in separator 62. The liquefied natural gas in phase separator 62 contains appreciable amounts of heavy hydrocarbons, and accordingly is not sent to storage but instead is used to provide low temperature refrigeration. The liquid is withdrawn from phase separator 62 by pipe 63, passed through expansion valve 64 and then to pipes 65 and 66 at about 38 p.s.i.a. and −230° F. about 138 MPH is passed through pipes 65 and 66 to heat exchanger 67 to provide low temperature refrigeration thereto. The major part of the vapor, 780 MPH, is removed from phase separator 62 and fed by pipe 70 at 365 p.s.i.a. and −140° F. to heat exchangers 22 and 67 where it is cooled to −230° F. at 360 p.s.i.a. Part of the stream leaves heat exchanger 67 and is fed by pipe 71 through expansion valve 72 to pipe 73 and then to storage tank 74 for storage at −259° F. at slightly above atmospheric pressure. The vapor formed in flashing through valve 72 is removed from tank 74 by pipe 75 at about −180° F., is compressed to 28 p.s.i.a. by compressor 79, and fed to pipe 21 to use the refrigeration it possesses to cool heat exchangers 22, 23, 24 and 13. Another part of the stream leaves heat exchanger 67 and is fed by pipe 76, through control valve 77, through pipe 78 to pipe 66 where it is fed to heat exchanger 67 to provide low temperature refrigeration.

By a proper split of the supply feed into first and second main streams entering expander-compressor 18, 19, it is possible to match the refrigeration curve to the load curve very closely. This minimizes the increase in entropy and provides a maximum liquefaction rate. Since the required refrigeration is broken down into relatively warm temperature refrigeration and cold refrigeration, it is possible to produce warm temperature refrigeration from the gas which is not cleaned of carbon dioxide. By removing a sufficient quantity of liquid from phase separator 62, cold refrigeration is obtained by using warm refrigeration. This very effectively solves the problem of producing sufficient cold refrigeration without excessive reduction in overall refrigeration. The process thus provides a unique combination of a single refrigerant with an expander cycle. The expansion of the carbon dioxide containing stream to a relatively warm temperature permits the recovery of power from the gas resulting in horsepower for use in raising the pressure of the second stream freed of carbon dioxide.

The foregoing detailed description has been given for clearness of understanding only, and no unnecessary limitations should be understood therefrom, as modifications will be obvious to those skilled in the art.

What is claimed is:

1. The method of liquefying natural gas containing initially carbon dioxide and hydrocarbons heavier than methane which comprises:

(a) taking a supply of natural gas at substantial pressure and ambient temperature, such as is received from a cross-country natural gas transportation pipeline, and dividing the supply into two main streams comprising a first main stream and a second main stream, (b) removing carbon dioxide from the second main stream, (c) lowering the temperature of the first main stream, without removal of carbon dioxide, by expansion of the stream through an expander-compressor to a substantially lower pressure and lower temperature than the supply, without solidification of carbon dioxide in the stream, to form a cold first main stream, while simultaneously compressing the second main stream subsequent to carbon dioxide removal therefrom, (d) cooling the second main stream in part by means of heat exchange with the cold first main stream and in part by the second part of the second main stream from step (e) to cool the second main stream and liquefy heavy hydrocarbons in the gas, (e) sending a first part of the cooled second main stream into heat exchange with the cold first main stream, and the second part of the second main stream from step (f), to further cool the first part of the second stream and separate a comparatively impure liquid natural gas fraction containing substantial heavy hydrocarbons, (f) sending a second part of the second main stream, after removal of heavy hydrocarbons, through an expander-compressor to expand second part and cool the same, while simultaneously compressing incoming gas of the second main stream and the so-cooled second part is passed into heat exchange with the first part of the second main stream to liquefy the same, and then the second part is passed into heat exchange with the second main stream to cool the same in conjunction with the first main stream in step (e) and then in step (d), (g) a further cooling the first part of the second main stream after said separation of impure liquefied natural gas fraction by heat exchange with refrigeration formed by expansion of the impure liquid natural gas fraction and a small side stream of the first part of the second main stream to subcool the second main stream to a temperature of about −230° F. and superatmospheric pressure, (h) and flashing the liquefied second part of the second main stream by pressure reduction to reduce its temperature to at least −259° F. for storage at about atmospheric pressure.

References Cited

UNITED STATES PATENTS

| 3,098,732 | 7/1963 | Dennis | 62—38 XR |
| 3,182,461 | 5/1965 | Johanson | 62—38 XR |
| 3,218,816 | 11/1965 | Grenier | 62—28 XR |
| 3,312,073 | 4/1967 | Jackson | 62—38 XR |
| 3,360,944 | 1/1968 | Knapp | 62—38 XR |
| 3,360,955 | 1/1968 | Witter. | |

WILBUR L. BASCOMB, Jr., Primary Examiner

U.S. Cl. X.R.

62—26, 38, 39, 18